(12) United States Patent
Matsumura

(10) Patent No.: US 6,717,612 B1
(45) Date of Patent: Apr. 6, 2004

(54) TRACKING CAMERA DEVICE

(75) Inventor: Hideki Matsumura, Kyoto (JP)

(73) Assignee: Sanyo Electric Co., LTD, Moriguchi (JP)

( * ) Notice: Subject to any disclaimer, the term of this patent is extended or adjusted under 35 U.S.C. 154(b) by 0 days.

(21) Appl. No.: 09/117,445

(22) PCT Filed: Jan. 30, 1997

(86) PCT No.: PCT/JP97/00252

§ 371 (c)(1),
(2), (4) Date: Jul. 31, 1998

(87) PCT Pub. No.: WO97/28645

PCT Pub. Date: Aug. 7, 1997

(30) Foreign Application Priority Data

Feb. 2, 1996 (JP) ............................................. 8-017498

(51) Int. Cl.⁷ ............................ H04N 5/225; H04N 7/18
(52) U.S. Cl. ........................ 348/169; 348/155; 348/171
(58) Field of Search ................................. 348/169, 171, 348/208, 155, 363

(56) References Cited

U.S. PATENT DOCUMENTS

| | | | | |
|---|---|---|---|---|
| 5,243,418 A | * | 9/1993 | Kuno et al. .................. 348/155 |
| 5,371,536 A | * | 12/1994 | Yamaguchi ................. 348/169 |
| 5,442,397 A | * | 8/1995 | Yoshimura et al. ......... 348/363 |
| 5,512,974 A | * | 4/1996 | Abe et al. .................... 348/169 |
| 5,574,498 A | * | 11/1996 | Sakamoto et al. .......... 348/169 |
| 5,627,586 A | * | 5/1997 | Yamasaki .................... 348/169 |
| 5,757,422 A | * | 5/1998 | Matsumura .................. 348/169 |
| 5,870,141 A | * | 2/1999 | Matsumura et al. ........ 348/169 |
| 6,002,428 A | * | 12/1999 | Matsumura et al. ........ 348/169 |
| 6,144,405 A | * | 11/2000 | Toba ............................ 348/208 |

* cited by examiner

Primary Examiner—Chris Kelley
Assistant Examiner—Allen Wong
(74) Attorney, Agent, or Firm—Westerman, Hattori, Daniels & Adrian, LLP

(57) ABSTRACT

An integrated data detecting circuit 14 integrates digital data for each of detecting blocks set within a movement detecting area. A tripod-head control circuit 16 detects a correlation value for this integrated data to previously-registered integrated data, and compares the correlation value with a threshold to determine a first detecting block corresponding to an object. The tripod-head control circuit 16 further determines a first detecting area including the most first detecting blocks among a plurality of detecting areas set in the movement detecting area, and supplies to a drive device 18 a tripod-head control signal corresponding to the position. Accordingly, the drive device 18 controls a tripod head 20 such that a camera 12 is shifted in position to a direction of the first detecting area. Since determination is made for a first detecting area including the most first detecting blocks, the camera can be stabilized when an object is moving finely.

6 Claims, 5 Drawing Sheets

TRACKING CAMERA DEVICE

BACKGROUND OF THE INVENTION

1. Field of the Invention

The present invention relates to tracking camera devices, and more particularly to a tracking camera device adapted to track an object that is imaged by a camera and captured at a detecting area thereof.

2. Description of the Related Art

There is one example of a tracking camera device to track an object that is imaged by a camera and captured within an detecting area, proposed in Japanese Patent Application No. H6-267347 applied for patent on Oct. 31, 1994. This technology involves a process of detecting a detecting block to be considered the same in color as a particular detecting block among a plurality of detecting blocks set within a motion vector detecting area. A motion vector for the object is estimated depending upon a weight center of the same-colored detecting block, thereby tracking the object according to the motion vector.

In such prior art, however, even where the object is finely moving within the motion vector detecting area, the camera will track the object in response to the movement thereof, resulting in a problem that the camera is placed unstable in position.

SUMMARY OF THE INVENTION

The present invention is, in a tracking camera device for tracking an object that is imaged by a camera and captured within a movement detecting area, the tracking camera device comprising: the movement detecting area including a plurality of detecting areas; each of the detecting areas including a plurality of detecting blocks; an integrating means for integrating pixel data for each of the detecting blocks; a first determining means for determining a plurality of detecting blocks corresponding to the object based on a result of integration; a second determining means for determining a first detecting area including the most of the first detecting blocks; and a control means for controlling a position of the camera to a direction of the first detecting area.

Accordingly, the integrating means integrates, for example, chrominance-related data for each detecting block included in the movement detecting area. Based on a result of the integration, the first determining means determines a plurality of first detecting blocks corresponding to an object. That is, the first determining means, for example, calculates a correlation value of the integration result to a previously-registered reference value, and compares the correlation value with a threshold to determine a first detecting block according to a result of the comparison. The second determining means then determines a first detecting area that contains the most first detecting blocks. The control means, in turn, controls the camera to a direction of the first detecting area.

Therefore, according to this invention, since the camera position is controlled to a direction of a first detecting area containing the most first detecting blocks, it is possible to stabilize the camera position when an object is finely moving or so.

DETAILED DESCRIPTION OF THE PREFERRED EMBODIMENT

Figure 1:
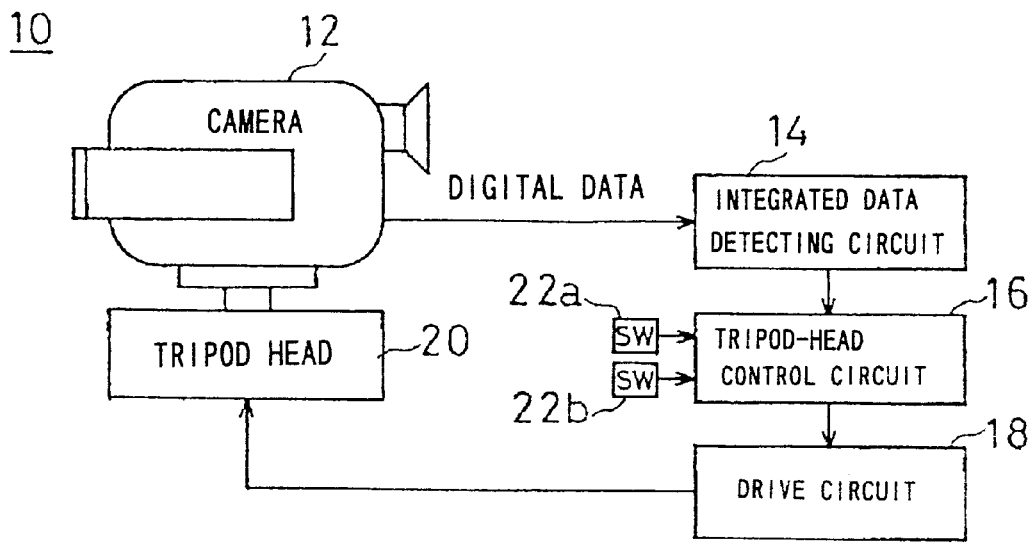
FIG. 1 is a block diagram showing a prefered exemplary embodiment of the present invention.
Figure 2:
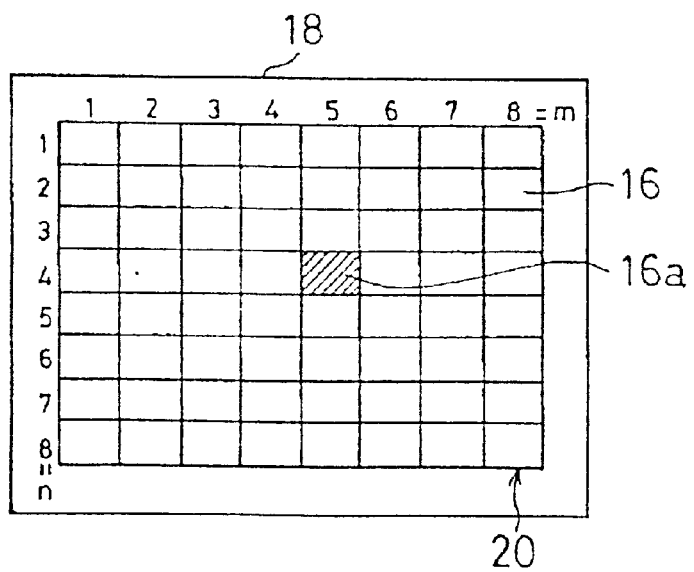
FIG. 2 is an illustrative view showing a movement detecting area set on a screen.
Figure 3:
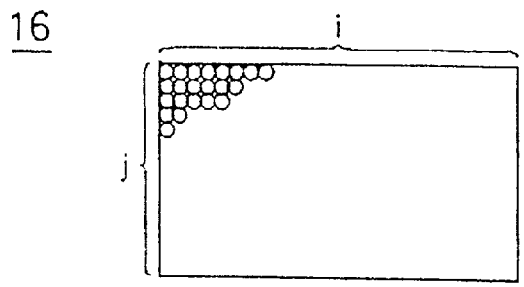
FIG. 3 is an illustrative view showing detecting blocks.

Referring to FIG. 1 a preferred exemplary embodiment of the present invention will be explained. A tracking camera device 10 in this embodiment includes a camera 12 that images an object to output digital data on a pixel-by-pixel basis. This digital data is signal digital data containing chrominance signals such as y, r–y, b–y signals. These signals are integrated for each detecting block 16 as shown in FIG. 2, by an integrated data detecting circuit 14. Explaining the detecting blocks 16 using FIG. 2 and FIG. 3, the detecting blocks 16 are set to have vertically 8 blocks and horizontally 8 blocks, i.e. totally 64 blocks, within a movement detecting area 20 set on a screen 18. Each detecting block 16 contains pixels in number of i×j. A detecting block 16, positioned at (m, n)=(5, 4), is taken as a particular detecting block 16a. The detecting block 16 set in this manner has integrated data as expressed by Equation 1.

$$Y_{mn} = \sum_{ij} y_{mn}$$ [Equation 1]

$$RY_{mn} = \sum_{ij} (r-y)_{mn}$$

$$BY_{mn} = \sum_{ij} (b-y)_{mn}$$

A tripod-head control circuit 16 first registers integrated data as to a particular detecting block 16a as a reference value, and then receives integrated data concerning each detecting block 16. Then, a calculation is made for a correlating value $D_{mn}$ of between the integrated data previously registered and the integrated data thereafter given, according to Equation 2. Further, the correlated value $D_{mn}$ is compared with a predetermined threshold to thereby determine a detecting block 16 lower than the threshold, i.e. a first detecting block.

$$D_{mn} = |Y_{mn} - Y| + |RY_{mn} - RY| + |By_{mn} - BY|$$ [Equation 2]

Y, RY, BY: registered integrated data

Figure 4:
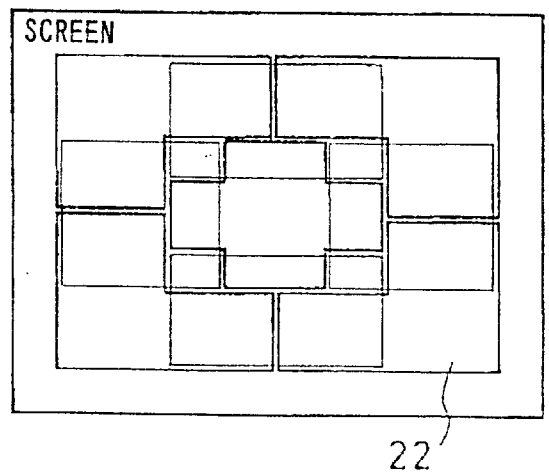
FIG. 4 is an illustrative view showing a movement detecting area set on the screen.
Figure 5:
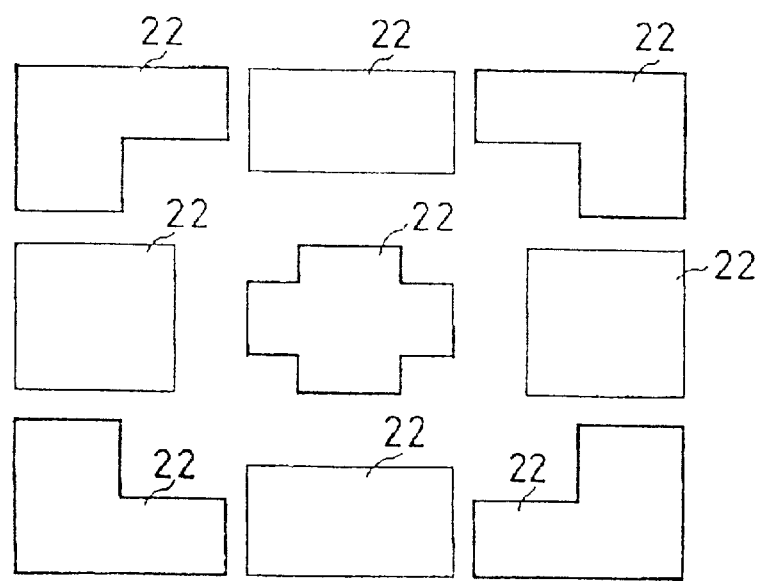
FIG. 5 is an illustrative view showing a plurality of detecting areas included in the movement detecting area.

The tripod-head control circuit 16 further determines a detecting area 22 containing the most first detecting blocks, i.e., a first detecting area, among a plurality of detecting areas arranged in the movement detecting area 20, as shown in FIG. 4. Here, the plurality of detecting areas 22 are arranged such that each area partly overlaps with an adjacent detecting area 22 except for a center in the movement detecting area 20, as shown in FIG. 4 and FIG. 5.

Figure 6:
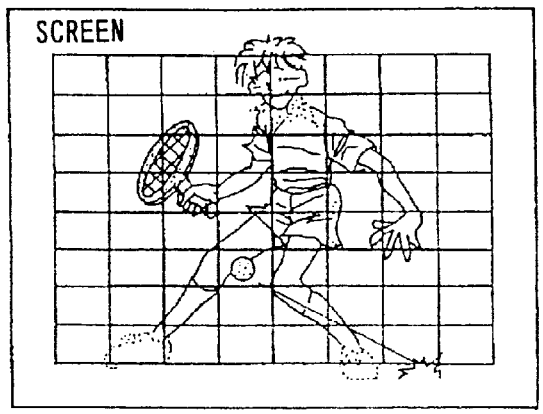
FIG. 6 is an illustrative view showing part the operation of the preferred exemplary embodiment shown in FIG. 1 to FIG. 5.
Figure 7:
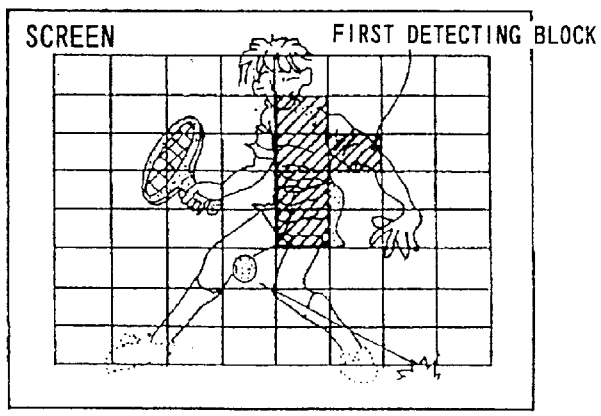
FIG. 7 is an illustrative view showing part of the operation of the preferred exemplary embodiment shown in FIG. 1 to FIG. 5.
Figure 8:
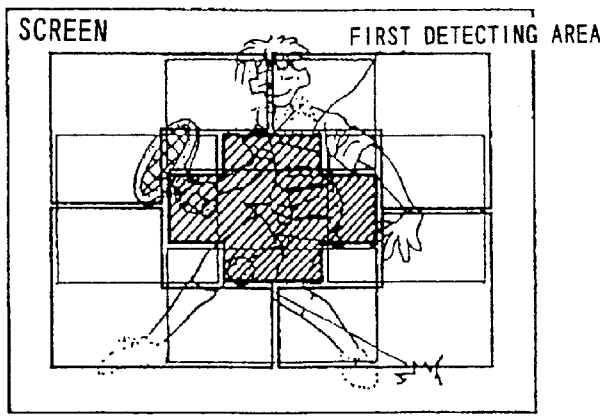
FIG. 8 is an illustrative view showing part of the operation of the preferred exemplary embodiment shown in FIG. 1 to FIG. 5.

Consequently, if integrated data on a chest of a person shown in FIG. 6 is registered at a certain field, then at a next field a hatched portion shown in FIG. 7 is determined as a first detecting block based on the integrated data detected at this field and the integrated chrominance data being registered. Further, a hatched portion shown in FIG. 8 is then determined as a first detecting area. The tripod-head control circuit 16 supplies to a drive device 18 a tripod-head control signal depending upon a position of the first detecting area so that the drive device 18 makes control on a tripod head 20. Consequently, the camera 12 is controlled in position to a direction of the first detecting area. Incidentally, in the case of FIG. 8, the camera 12 keeps stable without shifting its position.

Figure 9:
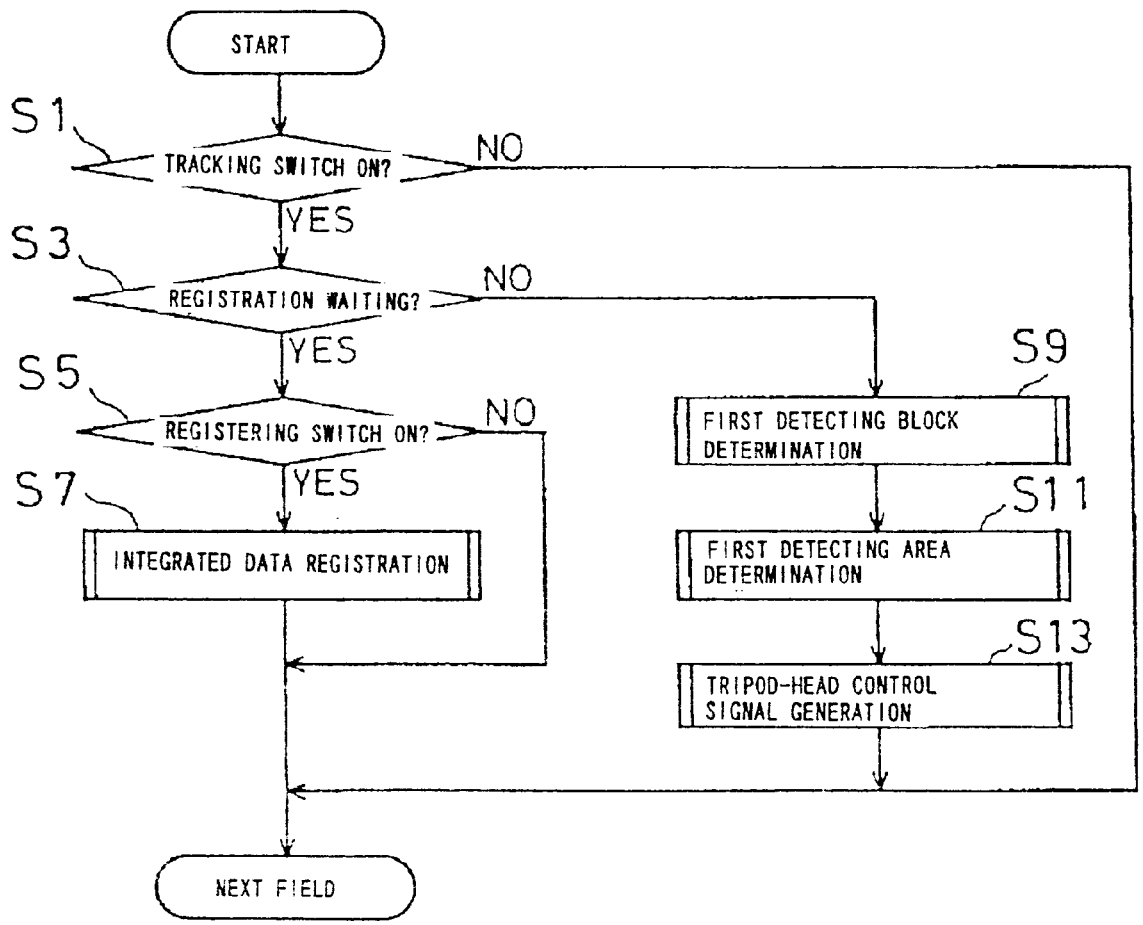
FIG. 9 is a flowchart showing part of operation shown in FIG. 1 to FIG. 8.
Figure 10:
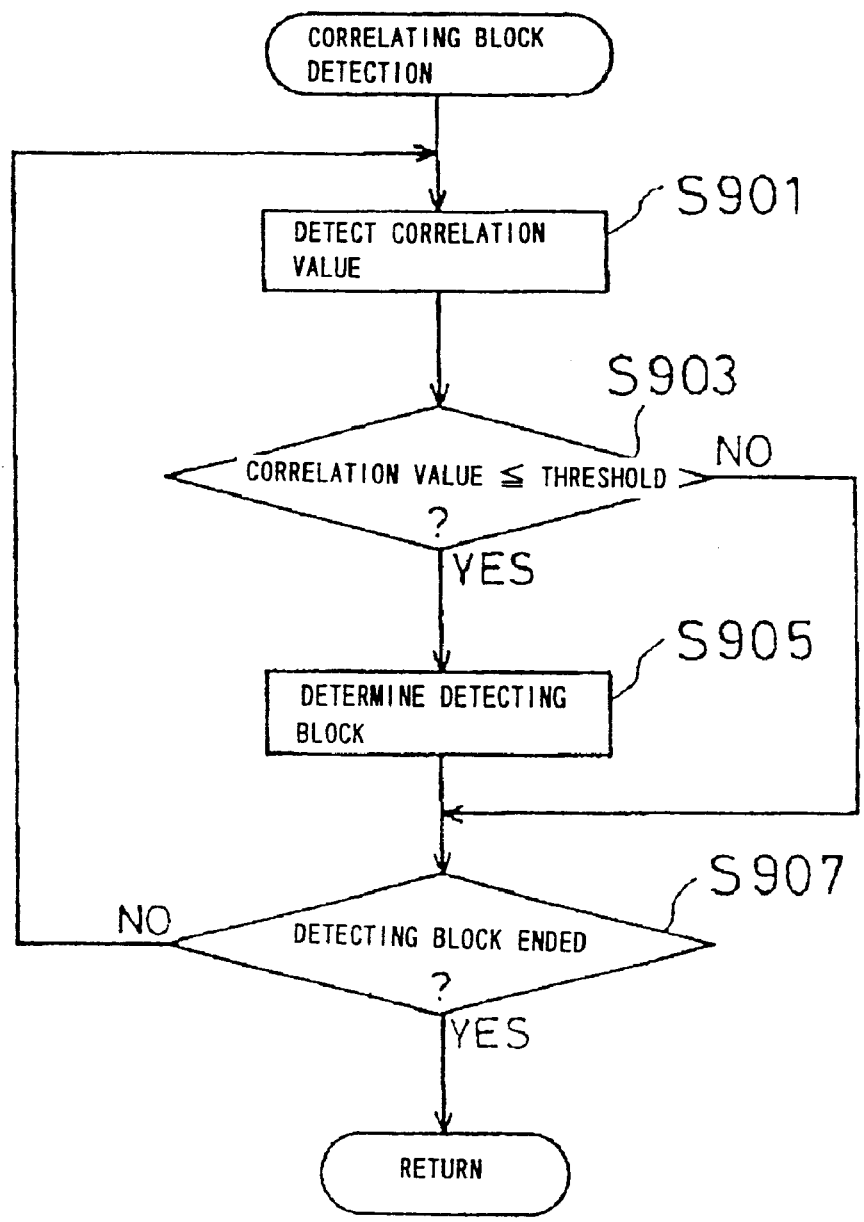
FIG. 10 is a flowchart showing a subroutine of the flowchart shown in FIG. 9.

The tripod-head control circuit 16 is configured by a micro-computer, to process according to flowcharts shown in FIG. 9 and FIG. 10. That is, it is determined at a first step S1 whether a tracking switch 22a is turned on or not. If "NO", the process proceeds to a next field process, while if "YES", the process is consideration as in a tracking mode and it is determined at a step S3 whether it is in a waiting state for integrated chrominance data of a particular detecting block 16a or not. If "YES", it is determined at a step S5 whether a registering switch 22b is turned on or not. If the determination here is "NO", the process proceeds to a next field process, while if "YES", the integrated data is registered at a step S7 and the process proceeds to a next field. On the other hand, if "NO" at the step S3, a first detecting block is determined at a step S9, a first detecting area is determined at a step S11, and a tripod-head control signal is generated at a step S13. Then the process proceeds to the next field process.

At the step S9, the tripod-head control circuit 16 makes processing according to a subroutine shown in FIG. 10. That is, a correlation value $D_{mn}$ is first detected by using Equation 2 at a step S901, and it is then determined at a step S903 whether the correlation value $D_{mn} \leq$ a threshold or not. If "YES", the detecting block 16 is determined as a first detecting block at a step S905, and the process proceeds to a step S907. However, if "NO", the process directly proceeds to the step S907. At the step S907 it is determined whether all the detecting blocks have been completed of processing or not. If "NO", the process returns to the step S901, while if "YES", the process returns.

According to this embodiment, detection is made for a first detecting area containing the most first detecting blocks to which direction the camera 12 is controlled in position. Accordingly, when an object is moving finely, the first detecting area will be always positioned at a center, thereby making it possible to stabilize the position of the camera 12.

Incidentally, in the preferred exemplary embodiment the digital data of the y, r-y and b-y signals were employed to detect a first detecting block. However, it is of course possible to use digital data of r, g and b signals or digital data of y, cb and cr signals. Here, integrated data as to r, g and b signals can be expressed by Equation 3, and a correlation value thereof is represented by Equation 4. Also, integrated data as to y, cb and cr signals is expressed by Equation 5, and a correlation value thereof is by Equation 6.

$$R_{mn} = \sum_{ij} r_{mn}$$ [Equation 3]

$$G_{mn} = \sum_{ij} g_{mn}$$

$$B_{mn} = \sum_{ij} b_{mn}$$

$$D_{mn} = |R_{mn} - R| + |G_{mn} - G| + |B_{mn} - B|$$ [Equation 4]

R, G, B: registered integrated data $$Y_{mn} = \sum_{ij} y_{mn}$$ [Equation 5]

$$Cb_{mn} = \sum_{ij} Cb_{mn}$$

$$Cr_{mn} = \sum_{ij} Cr_{mn}$$

$$D_{mn} = |Y_{mn} - Y| + |Cb_{mn} - Cb| + |C_{mn} - Cr|$$ [Equation 6]

Y, Cb, Cr: registered integrated data

Further, where using digital data of normalized chrominance signals such as (r-y)/y and (b-y)/y signals; r/y, g/y and b/y signals; $c_b/y$ and $c_r/y$ signals, there is no variation in hue in an image captured by the camera 12 even if there is variation in brightness. Accordingly, it is possible to successfully track an object even when there is change in amount of solar light or variation in brightness due to entering into and outing from a room or the like. The integrated data and correlation value, when using digital data of (r-y)/y and (b-y)/y signals, are respectively expressed by Equation 7 and Equation 8. The integrated data and correlation value, when using digital data of r/y, g/y and b/y signals, are respectively represented by Equation 9 and Equation 10. The integrated data and correlation value, when using digital data of cb/y and cr/y signals, are respectively expressed by Equation 11 and Equation 12.

$$\{(R-Y)/Y\}_{mn} = \sum_{ij} \{(r-y)/y\}_{mn}$$ [Equation 7]

$$\{(B-Y)/Y\}_{mn} = \sum_{ij} \{(b-y)/y\}_{mn}$$

$$D_{mn} = |\{R-Y\}/Y\}_{mn} - (R-Y)/Y| + |\{B-Y\}/Y\}_{mn} - (B-Y)/Y|$$ [Equation 8]

(R-Y)/Y, (B-Y)/Y: registered integrated data $$(R/Y)_{mn} = \sum_{ij} (r/y)_{mn}$$ [Equation 9]

$$(G/Y)_{mn} = \sum_{ij} (g/y)_{mn}$$

$$(B/Y)_{mn} = \sum_{ij} (b/y)_{mn}$$

$$D_{mn} = |(R/Y)_{mn} - R/Y| + |(G/Y)_{mn} - G/Y| + |(B/Y)_{mn} - B/Y|$$ [Equation 10]

R/Y, G/Y, B/Y: registered integrated data $$(Cb/Y)_{mn} = \sum_{ij} (c_b/y)_{mn}$$ [Equation 11]

$$(Cr/Y)_{mn} = \sum_{ij} (c_r/y)_{mn}$$

$$D_{mn} = |(Cb/Y)_{mn} - Cb/Y| + |(Cr/Y)_{mn} - Gr/Y|$$ [Equation 12]

Cb/Y, Cr/Y: registered integrated data

Incidentally, the figure pictures employed in FIG. 6 to FIG. 8 to explain this embodiment are those quoted from a software "Hanako" made by Justsystem Corporation.

What is claimed is:

1. A tracking camera device for tracking an object, comprising:
   a first former for forming a plurality of detecting blocks on a screen;
   a second former for forming a plurality of fixed detecting areas arranged on the screen simultaneously in a manner such that each of the detecting areas includes two or more detecting blocks out of said plurality of detecting blocks;
   an integrator for integrating pixel data for each of said detecting blocks;
   a first determiner for determining a plurality of detecting blocks corresponding to the objected base on a result of integration;
   a second determiner for controlling a position of said camera to a direction of said first detecting area,
   wherein whenever said first detecting area is changed to another detecting area, said controller controls the position of said camera to a direction of said another area, thereby tracking the object on an area-by-area basis.

2. A tracking camera device according to claim 1, wherein said first determining means includes a calculating means for calculating a correlation value of the calculation result to a reference value previously registered, a comparing means for comparing the correlation value with a threshold, and a detecting block determining means for determining the first detecting blocks according to a result of comparison.

3. A tracking camera device according to claim 1 or 2, wherein the detecting areas are arranged so as to partly overlap with one another except for a center of said movement detecting area.

4. A tracking camera device according to claim 1 or 2, wherein the pixel data contains chrominance-related data.

5. A tracking camera device according to claim 3, wherein the chrominance-related data contains chrominance signal data.

6. A tracking camera device according to claim 3, wherein the chrominance-related data contains normalized chrominance signal data.

* * * * *